United States Patent
Antonetti (10) Patent No.: US 10,917,137 B2
(45) Date of Patent: Feb. 9, 2021

(54) NFC ANTENNA IN A MOBILE DEVICE

(71) Applicant: STMicroelectronics Austria GmbH, Graz (AT)

(72) Inventor: Francesco Antonetti, Stirya (AT)

(73) Assignee: STMicroelectronics Austria GmbH, Graz (AT)

( * ) Notice: Subject to any disclaimer, the term of this patent is extended or adjusted under 35 U.S.C. 154(b) by 0 days.

(21) Appl. No.: 16/371,622

(22) Filed: Apr. 1, 2019

(65) Prior Publication Data

US 2019/0305824 A1 Oct. 3, 2019

(30) Foreign Application Priority Data

Apr. 3, 2018 (EP) .................................... 18165496

(51) Int. Cl.
*H04B 5/00* (2006.01)
*H01Q 7/00* (2006.01)
*H01Q 1/38* (2006.01)
*H01Q 1/24* (2006.01)

(52) U.S. Cl.
CPC ............. *H04B 5/0031* (2013.01); *H01Q 1/38* (2013.01); *H01Q 7/00* (2013.01); *H04B 5/0056* (2013.01); *H04B 5/0081* (2013.01); *H04B 5/0087* (2013.01); *H01Q 1/243* (2013.01)

(58) Field of Classification Search
CPC .. H04B 5/0031; H04B 5/0056; H04B 5/0081; H04B 5/0087; H01Q 1/38; H01Q 1/243; H01Q 7/00
USPC .............................................. 455/41.1, 575.7
See application file for complete search history.

(56) References Cited

U.S. PATENT DOCUMENTS

| | | | |
|---|---|---|---|
| 2014/0176447 A1* | 6/2014 | Alameh | G06F 3/044 345/173 |
| 2016/0148752 A1* | 5/2016 | Moon | H04B 5/0087 343/867 |
| 2016/0365635 A1 | 12/2016 | Jang et al. | |
| 2019/0326659 A1* | 10/2019 | Lyu | H04M 1/0264 |

FOREIGN PATENT DOCUMENTS

| | | |
|---|---|---|
| CN | 103682619 A | 3/2014 |
| CN | 104466350 A | 3/2015 |
| CN | 204442449 A | 7/2015 |
| CN | 204793171 U | 11/2015 |
| CN | 209993724 U | 1/2020 |
| DE | 102016011510 A1 | 3/2017 |
| WO | 2017206470 A1 | 7/2017 |

OTHER PUBLICATIONS

EPO Search Report and Written Opinion for EP18165496.3 dated Oct. 18, 2018 (7 pages).
First Office Action and Search Report for co-pending CN Appl. No. 201910249075.6 dated Jun. 23, 2020 (10 pages).

* cited by examiner

*Primary Examiner* — Lee Nguyen
(74) *Attorney, Agent, or Firm* — Crowe & Dunlevy

(57) ABSTRACT

An electronic device includes a back cover, a display, a middle frame sandwiched between the display and the back cover, and a near field communications (NFC) antenna incorporated within the middle frame. An electronic board is positioned within the middle frame, and includes an NFC controller and a matching network coupled to the NFC controller. The matching network is configured to match impedances between the NFC antenna and the NFC controller.

20 Claims, 5 Drawing Sheets

NFC ANTENNA IN A MOBILE DEVICE

PRIORITY CLAIM

This application claims the priority benefit of European Application for Patent No. 18165496.3, filed on Apr. 3, 2018, the content of which is hereby incorporated by reference in its entirety to the maximum extent allowable by law.

TECHNICAL FIELD

Embodiments relate to wireless communication between elements, for example between a reader and a transponder, in particular between a Near Field Communication (NFC) contactless tag reader, for example located within a wireless apparatus, such as a mobile phone, and a tag, using typically a high frequency communication operating at 13.56 MHz.

BACKGROUND

Embodiments herein relate more particularly to the NFC antennas located within such elements, in particular in a mobile phone or a phablet.

In addition to its conventional telephone function, a mobile phone may be used for exchanging information with a contactless device by using a contactless communication protocol.

This permits exchanging information between the contactless device and elements located within the mobile phone. Plenty of applications are thus possible, such as mobile ticketing in public transport (for example, the mobile phone is able to read the content of a boarding pass) or mobile payment (for example, the mobile phone is able to read the actual loaded value on a debit payment card).

In other applications the mobile phone may perform emulation in a card mode. In such a case, it operates as a card or a transponder (passive or active) and may be read by a contactless reader.

Near Field Communication or NFC is a short range high frequency wireless communication technology which enables such exchange of data between two contactless devices over a short distance, for example 10 centimeters.

NFC is an open platform technology standardized in ISO/IEC 18092 and ISO/IEC 21481 but incorporates a variety of pre-existing standards including ISO/IEC 14443 protocols type A and type B.

NFC devices have the capability to support, in particular, a reader/writer mode in which they can be used to read and write NFC transponders or tags.

A conventional NFC antenna for mobile phone includes a printed coil of conductive material (Cu or Al) stacked on a ferrite sheet, with an inductance between 1 µH to 2 µH. The antenna is located on the back side of the phone and placed on the battery.

Not only is the realization of the antenna difficult, but also in this configuration, the NFC transactions can be performed only on the back side of the phone, thus limiting the NFC usability for the user.

There is accordingly a need for extending the NFC usability.

There is also a need for simplifying the realization of an NFC antenna within a mobile device, such as a mobile phone or a phablet.

SUMMARY

An NFC antenna is an antenna configured to allow information transfers according to Near Field Communication.

According to an embodiment it is proposed to incorporate the NFC antenna in the middle frame of the mobile device, in particular at an end thereof, for example at the top end.

As a matter of fact, in most mobile devices having a middle frame, this middle frame is made from electrically conductive material, for example aluminum, and insulating material (i.e. non electrically conductive), such as plastic.

The electrically conductive part of the middle frame, for example the top part thereof, is particularly suitable for forming easily a NFC antenna.

Placing the NFC antenna in the middle frame, for example but not compulsorily at an end thereof, permits extending the space allowing the performance of the NFC transactions and an eventual contactless charging.

In other words, with such an antenna. NFC transactions and contactless charging (power transfer) may be performed on the back, on the front and on the side of the mobile device.

According to an aspect, a middle frame of a mobile device, in particular a mobile communication device, is proposed, incorporating an NFC antenna.

The NFC antenna is for example a loop antenna incorporated in an electrically conductive part of the middle frame, the inner part of the loop including a portion of an insulating part of the middle frame.

According to an embodiment, the NFC antenna is located at an end of the middle frame.

According to an embodiment, the middle frame includes a plate including at least one electrically conductive part and at least one insulating part, the NFC antenna having a loop formed into the at least one electrically conductive part and including two feeding points, the inner part of the loop being formed by a first portion of the at least one insulating part, both feeding points being separated by a gap formed by a second portion of the at least one insulating part.

According to an embodiment, the NFC antenna is intended to be coupled to a matching circuit having a differential architecture and the inductance value of the antenna is between 200 nH and 600 nH.

According to another possible embodiment, the NFC antenna is intended to be coupled to a matching circuit having a single-ended architecture and the inductance value of the antenna is between 100 nH and 350 nH.

The mobile device may be a mobile phone, such as a smartphone, or a phablet.

According to another aspect, a mobile device, in particular a mobile communication device, such as a mobile phone or a phablet, is proposed, including a display, a back cover, and a middle frame coupled on one side to the display and on another side to the back cover. The middle frame advantageously incorporates an NFC antenna, for example a loop antenna incorporating in an electrically conductive part of the middle frame, the inner part of the loop including a portion of an insulating part of the middle frame.

According to an embodiment, the NFC antenna is located at an end of the middle frame.

According to an embodiment, the middle frame includes a plate with at least one electrically conductive part and at least one insulating part, the NFC antenna having a loop formed into the at least one electrically conductive part and including two feeding points, the inner part of the loop being formed by a first portion of the at least one insulating part, both feeding points being separated by a gap formed by a second portion of the at least one insulating part.

According to an embodiment, the mobile device also includes an electronic board lodged within the middle frame and including a NFC controller coupled to the NFC antenna through a matching circuit.

According to an embodiment, the mobile device includes electrically conductive spring pins coupled to the matching circuit and to the feeding points and located between the electronic board and the middle frame.

According to an embodiment, the matching circuit has a differential architecture and the inductance value of the antenna is between 200 nH and 600 nH.

According to an embodiment, the matching circuit has a single-ended architecture and the inductance value of the antenna is between 100 nH and 350 nH.

According to an embodiment, the mobile device also includes an additional inductive circuit coupled between the matching circuit and the antenna.

BRIEF DESCRIPTION OF THE DRAWINGS

Other advantages and features will appear in the detailed description below and in the appended drawings which are not limitative, in which.

DETAILED DESCRIPTION

Figure 1:
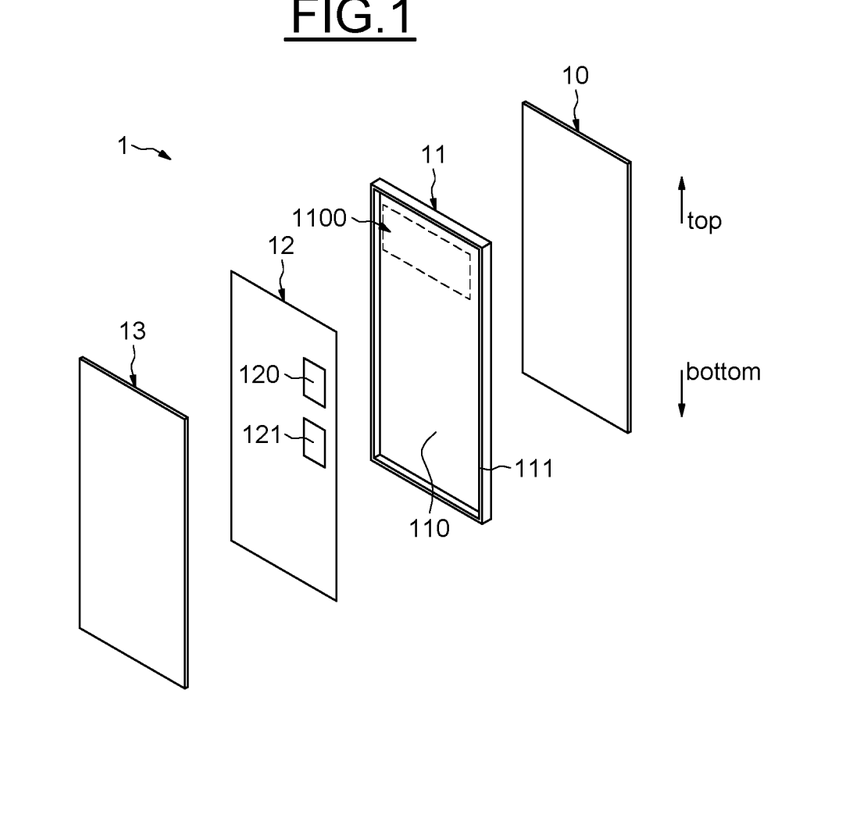
FIG. 1 is an exploded view of a mobile device including a NFC antenna in accordance with this disclosure.

In FIG. 1, reference 1 designates a mobile device, for example a mobile phone or a phablet.

The mobile device comprises several elements such as a display 10, a middle frame 11, an electronic board 12 including electronic components, and a back cover 13.

Some other elements may be also incorporated in the mobile phone, but if any, they are not represented in FIG. 1 for simplification reasons.

In this example, the middle frame comprises a plate 110 surrounded by an edge 111.

A middle frame is generally the main frame of the mobile device as it is intended to lodge the electronic board on one side and support the display on the other side.

As it will be explained more in detail thereafter, the middle frame here incorporates an NFC antenna 1100.

In this example, the NFC antenna is located at the top end of the middle frame.

Figure 2:
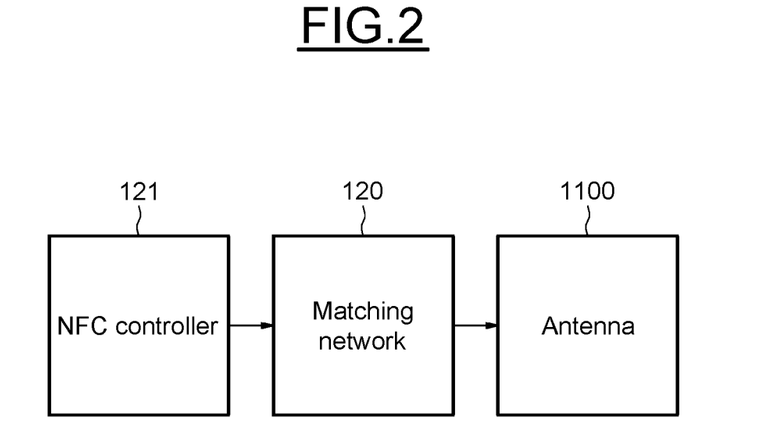
FIG. 2 is a block diagram of NFC related components of the mobile device of FIG. 1.

Because of the presence of this NFC antenna 1100, the electronic board 112 comprises a NFC controller 121 coupled to the antenna 1100 through a matching network 120, as illustrated schematically in FIG. 2.

The electrical connection between the matching network 120 and the antenna will be explained in greater detail thereafter.

Figure 3:
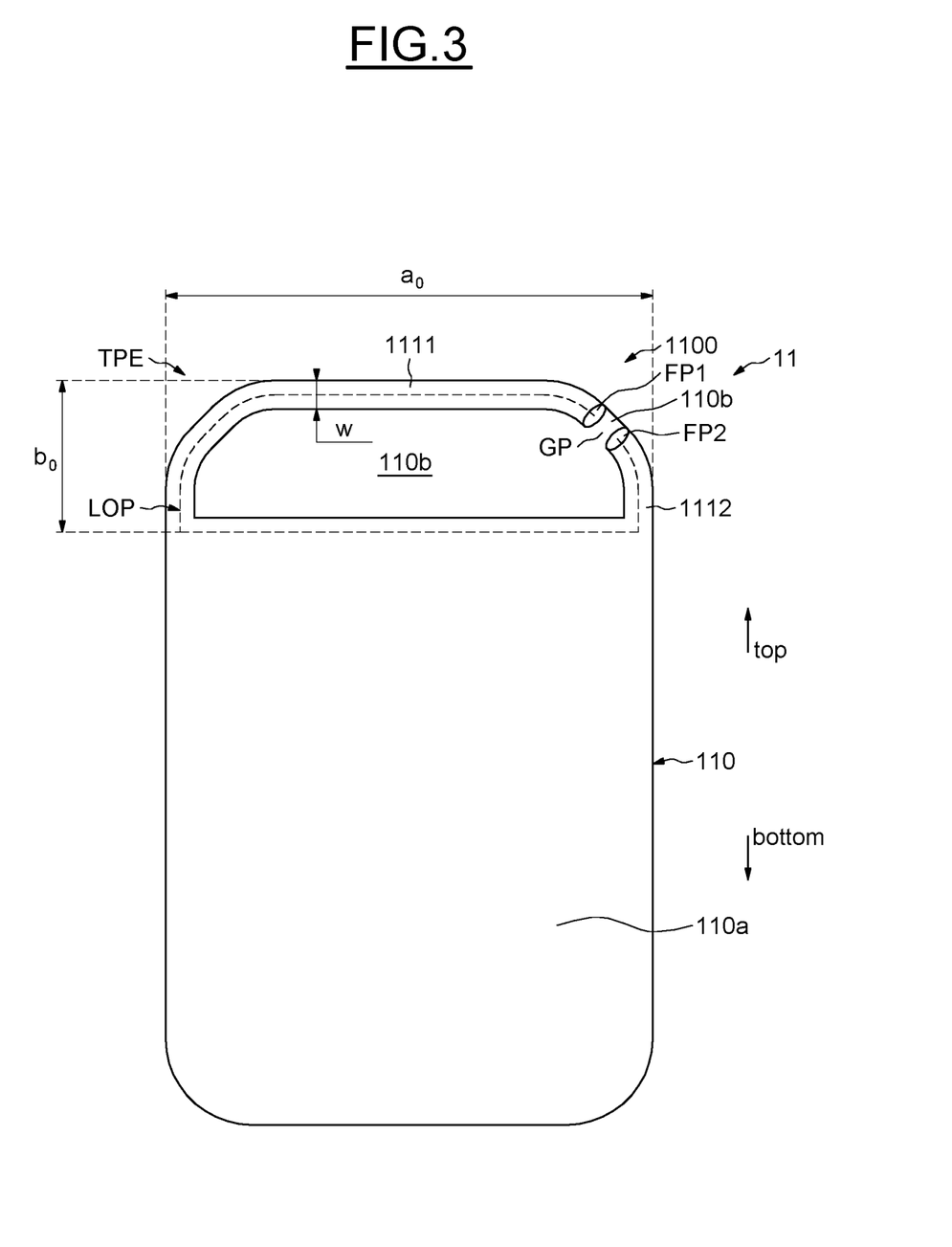
FIG. 3 illustrates schematically an embodiment of the middle frame of the mobile device of FIG. 1 incorporating an NFC antenna.

FIG. 3 illustrates more in details, but still schematically, an embodiment of the middle frame incorporating the NFC antenna.

As it can be seen on this figure, the NFC antenna is incorporated within the plate 110 of the middle frame 11.

In this example, the central part and the bottom part of the plate 110 is an electrically conductive part 110a made, for example, on aluminum.

Of course, in some other possible examples, those central and bottom parts of the plate may also contain areas of insulating material such as plastic.

The top end TPE of the plate comprises here a first branch 1111, made also with the electrically conductive material and a second branch 1112 being also electrically conductive.

At the end of those two branches are provided two feeding points FP1 and FP2 for the NFC antenna 1100.

The two feeding points FP1 and FP2 are separated by an insulating gap GP made of the insulated material of the plate 11, for example plastic.

This structure forms accordingly, as illustrated on FIG. 3, an electrically conductive loop LOP forming the NFC loop antenna 1100.

The inner part 110b of the loop is also made with the insulating material 110b of the plate 110 of the middle frame 11.

As indicated above, the NFC controller 121 is connected to the antenna 1100 through a matching network 120.

Figure 4:
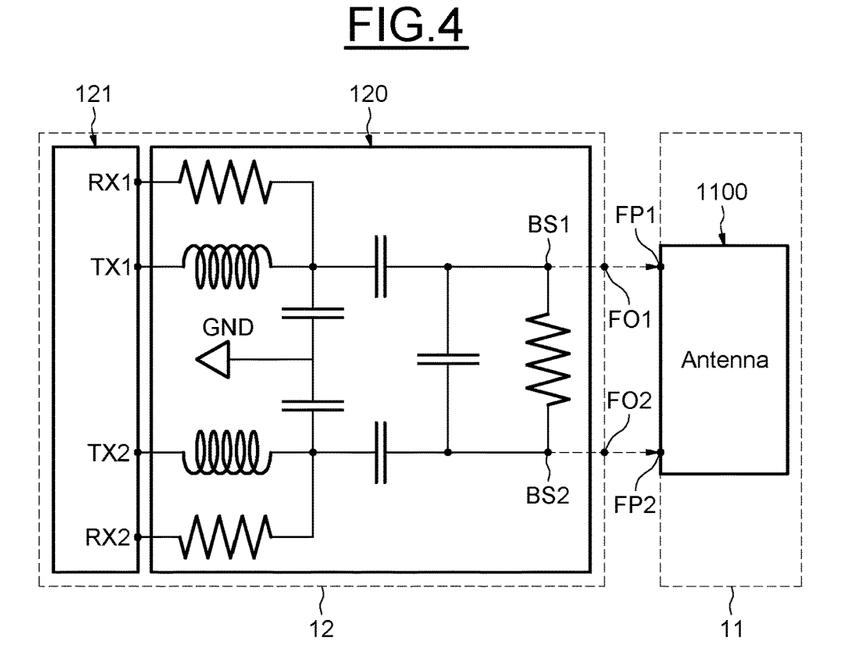
FIG. 4 illustrates a first embodiment of matching network such as may be used in the mobile device of FIG. 2.
Figure 5:
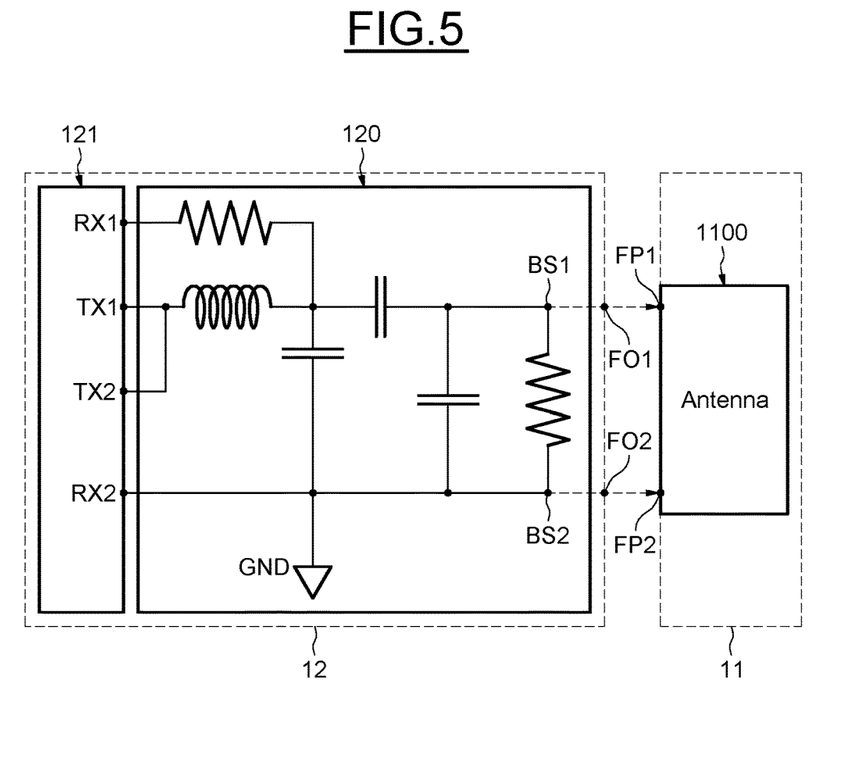
FIG. 5 illustrates a second embodiment of matching network such as may be used in the mobile device of FIG. 2.

FIG. 4 and FIG. 5 illustrate two different architectures for the matching network.

The matching network is a circuit which adjusts the antenna impedance to a desired value for the chip driver output. The matching network also comprises, generally, a filter, called EMI filter, which is intended to filter the electromagnetic interferences.

This filter is conventionally an inductive capacitive filter.

The matching network is connected to two reception inputs RX1 and RX2 of the NFC controller and to the two transmission outputs TX1, TX2 of the NFC controller.

FIG. 4 illustrates an example of a differential architecture of the matching circuit.

Such differential architecture is used when the outputs of the NFC controller are driven differentially. The two outputs TX1 and TX2 are opposite in phase to permit doubling of the voltage swing from a single supply voltage.

FIG. 5 illustrates a single ended architecture of the matching network 120 which is, for example, used when the outputs TX1 and TX2 of the NFC controller are driven in phase and the voltage swing is the same as the supply voltage.

The single ended architecture leads to fewer matching components but a lower output power than in the differential architecture.

In both architectures, the EMI filter permits reduction of the potential interferences with other antennas which would be integrated in the mobile phone, for example GPS antenna or the like.

As illustrated on those FIGS. 4 and 5, the NFC controller 121 and the matching network 120 are placed on the electronic board 12 together with the other electronic components of the mobile device.

The two output terminals BS1 and BS2 of the matching circuit are connected to contact points FO1 and FO2 of the electronic board 12.

Those electronic points FO1 and FO2 are also electrically coupled to the two feeding points FP1 and FP2 of the antenna 1100 which is located on the middle frame 11.

Figure 6:
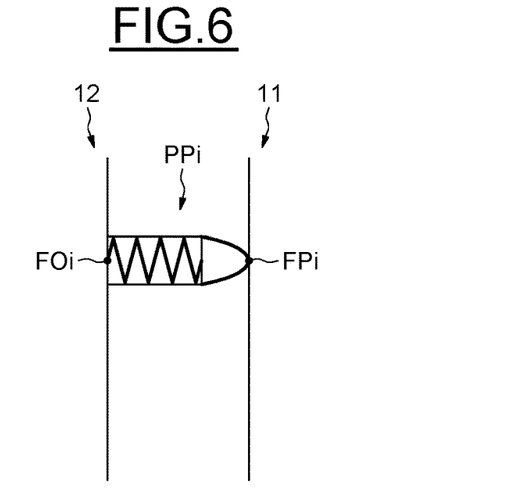
FIG. 6 illustrates a possible embodiment of the electrical coupling between contact points and feeding points of FIGS. 5 and 6.

As illustrated on FIG. 6, the electrically coupling between the contact points FOi and the feeding points FPi may comprise electrically conductive spring pins PPi, (also known as "pogo pins").

Thus, when the electronic board 12 is lodged in the middle frame and the telephone is assembled, there is an actual electrical coupling between the output of the matching network 120 and the feeding points of the NFC antenna 1100.

Figure 7:
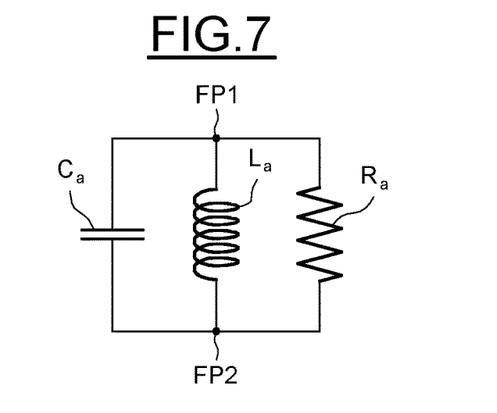
FIG. 7 illustrates an equivalent circuit model of the NFC antenna of FIG. 1.

The NFC antenna structure can be modeled as shown in FIG. 7.

$L_a$ is the inductance value of the antenna.

The antenna has an inductance value that is proportional to the length of the structure.

$R_a$ is the resistance value of the antenna. This value is proportional to the length and the material used.

$C_a$ is a parasitic capacitance, and mainly depends on whether the antenna is a single loop antenna or if it has more turns. In practice, a single loop antenna has a very low parasitic capacitance while a multiple turn coil has a higher value due to the distance between turns.

In the present example, the NFC loop antenna incorporated in the plate of the middle frame is a single loop antenna.

The inductance value $L_a$ of the NFC antenna, which is assumed here to be a single loop antenna, may be calculated by formula (1) below:

$$L_a = \mu o [x_1 + x_2 - x_3 + x_4]/\pi \quad (1).$$

In formula (1), $\mu o$ is the magnetic permittivity of the conductive material of the NFC antenna.

$x_1$, $x_2$, $x_3$ and $x_4$ in formula (1) are defined in formulas (2), (3), (4) and (5):

$$x_1 = a_{avg} \cdot \ln[(2 \cdot a_{avg} \cdot b_{avg})/(d \cdot (a_{avg} + (a_{avg}^2 \pm b_{avg}^2)^{1/2}))] \quad (2)$$

$$x_2 = b_{avg} \cdot \ln[(2 \cdot a_{avg} \cdot b_{avg})/(d \cdot (b_{avg} + (a_{avg}^2 + b_{avg}^2)^{1/2}))] \quad (3)$$

$$x_3 = 2 \cdot [a_{avg} + b_{avg} - (a_{avg} \cdot b_{avg}^2)^{1/2}] \quad (4)$$

$$x_4 = (a_{avg} + b_{avg})/4 \quad (5).$$

$a_{avg}$ and $b_{avg}$ are given in formulas (6) and (7) in which $a_0$ is the overall width of the loop while $b_0$ is the overall height of the loop (see FIG. 3 for example):

$$a_{avg} = a_0 - w/2 \quad (6)$$

$$b_{avg} = b_0 - w/2 \quad (7).$$

d is given by formula (8) in which t is the thickness of the branch 1111 while w is the width of the branch 1111 (see FIG. 3 for example):

$$d = \frac{2(t+w)}{\pi}. \quad (8)$$

In order to have an operation compatible with the NFC requirement, the matching circuit and the antenna have a resonance frequency equal to the carrier frequency, for example 13.56 Mhz.

Generally speaking, the man skilled in the art knows how to configure a matching circuit. For example, an EMI filter having a cut frequency of 20 Mhz is well adapted for a carrier frequency of 13.56 Mhz.

Generally speaking, the resonance frequency of the NFC antenna taken alone is higher than 13.56 Mhz, and may be for example of the order of 1 Ghz.

The man skilled in the art can calculate the dimensions of the NFC antenna loop in order to have together with the matching circuit, a global resonance frequency equal or near to 13.56 Mhz.

For example, when a matching circuit having a differential architecture is used, the inductance value of the NFC antenna may be comprised between 200 nH and 600 nH.

When a matching circuit has a single ended architecture, the inductance value of the NFC antenna may be comprised between 100 nH and 350 nH.

As a non-limiting example, with $a_0$ of the order of 70 mm, $b_0$ of the order of 15 mm and t of the order of 1 mm, which is compliant with the dimensions of a middle frame of a smartphone, an inductance value $L_a$ of 129 nH may be obtained.

A possible solution for adjusting the dimensions of the antenna loop may be based on inductance values, resistance values and capacitance value measurements with antenna loops having different sizes.

Such measurements may be performed by a conventional vector network analyzer, for example the vector network analyzer E5061B 5 Hz-3 Ghz by the Keysight Company.

Nevertheless, the inductance value can vary according to the surrounding environment, for example when the mobile phone is fully assembled. More precisely, the presence of the display or the electronic board is loading the structure and the value of the inductance can decrease accordingly.

Figure 8:
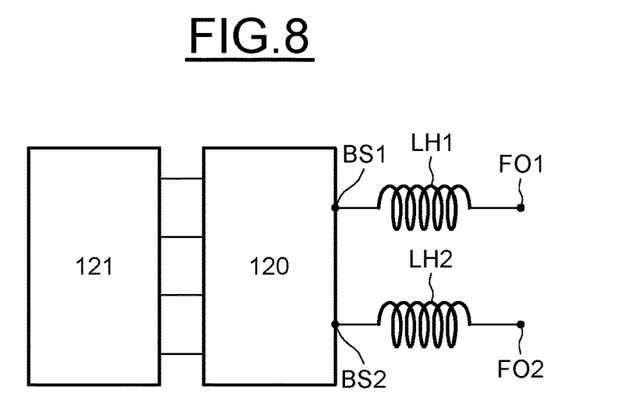
FIG. 8 illustrates a potential modification to the block diagram of FIG. 2 in which an additional inductive circuit is added between the matching network and antenna.

In such a case, as illustrated in FIG. 8, an additional inductive circuit, comprising two additional inductors LH1, LH2 connected between the output terminals BS1, BS2 and the contact points FO1 and FO2, may be added.

Figure 9:
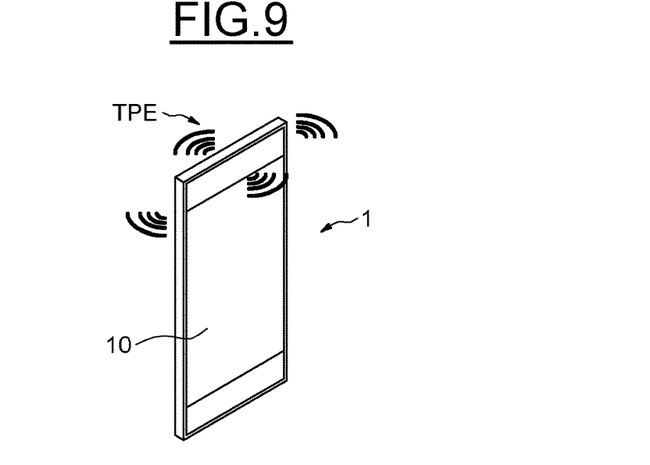
FIG. 9 is a perspective view of the mobile device of FIG. 1 illustrating the advantages possessed by this design in which the NFC antenna is located within the middle frame.

As illustrated in FIG. 9, providing the NFC antenna within the middle frame of the mobile device, in particular at an end of the middle frame, for example the top end TPE of the middle frame, allows to perform NFC transactions and contactless power transfers on the back, on the front, or on the side of the mobile device.

Figure 10:
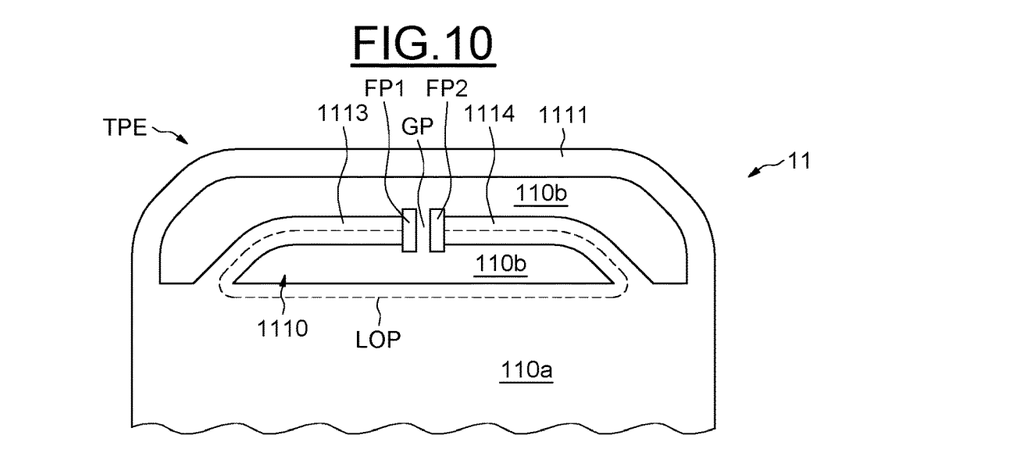
FIG. 10 illustrates schematically another embodiment of the middle frame of the mobile device of FIG. 1 incorporating an NFC antenna.
Figure 11:
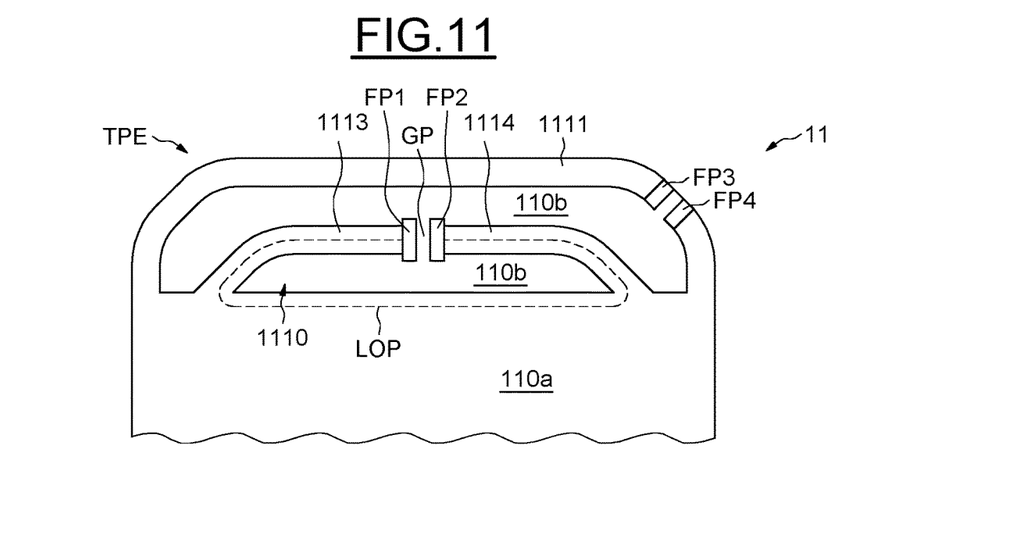
FIG. 11 illustrates schematically yet another embodiment of the middle frame of the mobile.

As illustrated on FIG. 10 and FIG. 11, other embodiments are possible.

As a matter of fact, when the middle frame is composed by aluminum and plastic material, a dedicated layout for the NFC antenna can be easily created in the design phase.

The dimension of the trace can be easily calculated by using the formulas in annex.

The shape and the outer size of the dedicated NFC structure can vary according to the area constraints in the phone.

However, the basic structure remains the loop and will allow the current to generate magnetic field, the field intensity being directly proportional to the free area 110b of the inner part of the loop antenna.

For example, in FIG. 10, the plate of the middle frame 11 may comprise two additional branches 1113 and 1114 extending between the branch 1111 and the conductive part 110a.

These two additional branches 1113 and 1114 support at their ends the feeding points FP1 and FP2 which are still separated by the insulating gap GP.

The loop LOP of the NFC antenna 1110 passes through the additional branches 1113 and 1114.

FIG. 11 differs from FIG. 10 by the fact that the external branch 1111 of the plate of the middle frame 11 is supporting two other feeding points FP3 and FP4.

This branch 1111 may thus form another antenna for the mobile phone, for example a GPS antenna collocated with the antenna 1110.

As a variant, it may be possible that the same antenna loop structure, for example the one illustrated in FIG. 3, may be used for a NFC antenna and another antenna, for example a GPS antenna or a WiFi antenna.

As a matter of fact, thanks to the EMI filter in the NFC matching network, the frequencies above 20 MHz are suppressed due to a second order low pass filter. This allows coexistence between NFC technology and other technologies operating at other frequencies, in particular GPS and WiFi operating at frequencies above 1.2 GHz.

The invention claimed is:

1. A middle frame of a mobile device, comprising:
   a middle frame portion formed by a plate surrounded on its periphery by an edge extending outwardly from the plate; and
   a near field communication (NFC) antenna incorporated with the plate of the middle frame portion and being located at an end of the plate;
   wherein the plate comprises:
      an electrically conductive portion substantially surrounding a non-conductive portion, the electrically conductive portion forming an external branch extending about a perimeter of the non-conductive portion; and
      an additional electrically conductive portion substantially surrounding an additional non-conductive portion, the additional electrically conductive portion forming a third branch extending between perimeters of the non-conductive portion and the additional non-conductive portion in a clockwise direction and terminating at a third feed point, the additional electrically conductive portion also forming a fourth branch extending between perimeters of the non-conductive portion and the additional non-conductive portion in a counterclockwise direction and terminating at a fourth feed point, wherein the third and fourth feed points are separated to define a gap filled by respective parts of the non-conductive portion and the additional non-conductive portion.

2. The middle frame according to claim 1, wherein the NFC antenna is coupled to a matching circuit having a differential architecture, the NFC antenna having an inductance value of between 200 nH and 600 nH.

3. The middle frame according to claim 1, wherein the NFC antenna is coupled to a matching circuit having a single-ended architecture, and wherein an inductance value of the antenna is between 100 nH and 350 nH.

4. The middle frame according to claim 1, wherein the mobile device is a mobile phone or a phablet.

5. A mobile device, comprising:
   a display;
   a back cover; and
   a middle frame coupled on one side to the display and on another side to the back cover, wherein the middle frame is formed by a plate surrounded on its periphery by an edge extending outwardly from the plate, wherein the middle frame incorporates a near field communication (NFC) antenna at an end of the plate;
   wherein the plate comprises:
      an electrically conductive portion substantially surrounding a non-conductive portion, the electrically conductive portion forming an external branch extending about a perimeter of the non-conductive portion; and
      an additional electrically conductive portion substantially surrounding an additional non-conductive portion, the additional electrically conductive portion forming a third branch extending between perimeters of the non-conductive portion and the additional non-conductive portion in a clockwise direction and terminating at a third feed point, the additional electrically conductive portion also forming a fourth branch extending between perimeters of the non-conductive portion and the additional non-conductive portion in a counterclockwise direction and terminating at a fourth feed point, wherein the third and fourth feed points are separated to define a gap filled by respective parts of the non-conductive portion and the additional non-conductive portion.

6. The mobile device according to claim 5, further comprising an electronic board within the middle frame and including a NFC controller coupled to the NFC antenna through a matching circuit.

7. The mobile device according to claim 6, further comprising electrically conductive spring pins coupled to the matching circuit and located between the electronic board and the middle frame.

8. The mobile device according to claim 6, wherein the matching circuit has a differential architecture and an inductance value of the NFC antenna is between 200 nH and 600 nH.

9. The mobile device according to claim 6, wherein the matching circuit has a single-ended architecture and an inductance value of the NFC antenna is between 100 nH and 350 nH.

10. The mobile device according to claim 6, further comprising an additional inductive circuit coupled between the matching circuit and the NFC antenna.

11. The mobile device according to claim 5, wherein the mobile device is a mobile phone.

12. An electronic device, comprising:
    a back cover;
    a display;
    a middle frame sandwiched between the display and the back cover, wherein the middle frame is formed by a plate surrounded on its periphery by an edge extending outwardly from the plate;
    a near field communications (NFC) antenna incorporated within the middle frame at an end of the plate; and
    an electronic board positioned within the middle frame, the electronic board including an NFC controller and a matching network coupled to the NFC controller, the matching network configured to match impedances between the NFC antenna and the NFC controller;
    wherein the NFC controller has first and second NFC controller receive inputs and first and second NFC controller transmit outputs; and wherein the matching network comprises:
      an LC network coupled between the first and second NFC controller transmit outputs and first and second output terminals;
      a first resistance coupled between the first NFC controller receive input and the LC network; and a second resistance coupled between the first and second output terminals.

13. The electronic device of claim 12, wherein the plate comprises an electrically conductive portion substantially surrounding a non-conductive portion, the electrically conductive portion forming a first branch extending about a perimeter of the non-conductive portion in a clockwise direction and terminating at a first feed point, and a second branch extending about the perimeter of the non-conductive portion in a counterclockwise direction and terminating at a second feed point, wherein the first and second feed points are separated to define a gap filled by the non-conductive portion.

14. The electronic device of claim 13, wherein the matching network further comprises a third resistance coupled between the second NFC controller receive input and the LC network; and wherein the LC network comprises:
   a first inductor coupled between the first NFC controller transmit output and a first node;
   a second inductor coupled between the second NFC controller transmit output and a second node;
   first and second capacitors coupled in series between the first and second nodes, with a center tap of the first and second capacitors being coupled to ground;
   a third capacitor coupled between the first node and the first output terminal;
   a fourth capacitor coupled between the second node and the second output terminal; and
   a fifth capacitor coupled in parallel with the second resistance between the first and second output terminals.

15. The electronic device of claim 13, further comprising a first pogo pin making physical and electrical contact between the first output terminal and the first feed point of the NFC antenna, and a second pogo pin making physical and electrical contact between the second output terminal and the second feed point of the NFC antenna.

16. The electronic device of claim 13, further comprising a first output inductor coupled between the first output terminal and the first feed point of the NFC antenna and a second output inductor coupled between the second output terminal and the second feed point of the NFC antenna.

17. The electronic device of claim 13, wherein the LC network comprises:
   a first inductor having a first terminal coupled to the first and second NFC controller transmit outputs and a second terminal coupled to a first node;
   a first capacitor having a first plate coupled to the first node and a second plate coupled to the second NFC controller receive input and ground;
   a second capacitor coupled between the first node and the first output terminal; and
   a third capacitor coupled in parallel with the first resistance between the first output terminal and the second output terminal.

18. The electronic device of claim 13, further comprising an additional electrically conductive portion substantially surrounding an additional non-conductive portion, the additional electrically conductive portion forming a third branch extending between perimeters of the non-conductive portion and the additional non-conductive portion in a clockwise direction and terminating at a third feed point, the additional electrically conductive portion also forming a fourth branch extending between perimeters of the non-conductive portion and the additional non-conductive portion in a counterclockwise direction and terminating at a fourth feed point, wherein the third and fourth feed points are separated to define an additional gap filled by respective parts of the non-conductive portion and the additional non-conductive portion.

19. The electronic device of claim 18, wherein the gap and the additional gap are not aligned.

20. An electronic device comprising:
   a back cover;
   a display;
   a middle frame sandwiched between the display and the back cover, wherein the middle frame is formed by a plate surrounded on its periphery by an edge extending outwardly from the plate;
   a near field communications (NFC) antenna incorporated within the middle frame at an end of the plate; and
   an electronic board positioned within the middle frame, the electronic board including an NFC controller and a matching network coupled to the NFC controller, the matching network configured to match impedances between the NFC antenna and the NFC controller;
   wherein the plate comprises:
      an electrically conductive portion substantially surrounding a non-conductive portion, the electrically conductive portion forming an external branch extending about a perimeter of the non-conductive portion; and
      an additional electrically conductive portion substantially surrounding an additional non-conductive portion, the additional electrically conductive portion forming a third branch extending between perimeters of the non-conductive portion and the additional non-conductive portion in a clockwise direction and terminating at a third feed point, the additional electrically conductive portion also forming a fourth branch extending between perimeters of the non-conductive portion and the additional non-conductive portion in a counterclockwise direction and terminating at a fourth feed point, wherein the third and fourth feed points are separated to define a gap filled by respective parts of the non-conductive portion and the additional non-conductive portion.

\* \* \* \* \*